US009400122B2

(12) United States Patent
Kim et al.

(10) Patent No.: US 9,400,122 B2
(45) Date of Patent: Jul. 26, 2016

(54) SOLAR THERMAL SYSTEM (75) Inventors: Sung Kab Kim, Suwon-si (KR); Hyeon Gil Shin, Incheon (KR)

(73) Assignee: KYUNGDONG NAVIEN CO., LTD., Pyeongtaek-si, Gyeonggi-do (KR)

( * ) Notice: Subject to any disclaimer, the term of this patent is extended or adjusted under 35 U.S.C. 154(b) by 871 days.

(21) Appl. No.: 13/697,045

(22) PCT Filed: Mar. 20, 2011

(86) PCT No.: PCT/KR2011/001906
§ 371 (c)(1),
(2), (4) Date: Dec. 4, 2012

(87) PCT Pub. No.: WO2011/142531
PCT Pub. Date: Nov. 17, 2011

(65) Prior Publication Data
US 2013/0074827 A1 Mar. 28, 2013

(30) Foreign Application Priority Data

May 13, 2010 (KR) .................. 10-2010-0045039

(51) Int. Cl.
*F24J 2/40* (2006.01)
*F24J 2/30* (2006.01)
(Continued)

(52) U.S. Cl.
CPC . *F24J 2/402* (2013.01); *F24D 3/08* (2013.01); *F24D 11/004* (2013.01);
(Continued)

(58) Field of Classification Search
CPC ................................ F24J 2/30; F24J 2/4625
USPC ......... 126/585, 588–589, 609–616, 628–632, 126/640–641, 643, 646; 236/12.1
See application file for complete search history.

(56) References Cited

U.S. PATENT DOCUMENTS 4,027,821 A * 6/1977 Hayes et al. ................... 126/588
4,034,738 A * 7/1977 Barber, Jr. ..................... 126/586
(Continued)

FOREIGN PATENT DOCUMENTS

JP S59-100353 A 6/1984
JP S63-123955 U 8/1988
(Continued)

OTHER PUBLICATIONS

Machine translation of KR 10-2010-0106165 A.*
(Continued)

*Primary Examiner* — Avinash Savani
*Assistant Examiner* — Vivek Shirsat
(74) *Attorney, Agent, or Firm* — Novick, Kim & Lee, PLLC; Jae Youn Kim (57) ABSTRACT

The present invention relates to a solar thermal system which has improved use efficiency, enables heat acquired in a heat-collecting unit to be quickly used for a heating and hot water supply load, and can be operated in a stable manner. A solar thermal system comprises: a solar heat collector that absorbs solar heat and heats a heat medium received therein; a heat storage tank that contains heating water, includes a first heat storage exchanger and a second heat storage exchanger connected to the solar heat collector through an heat storage pipe at the upper and lower portions therein respectively, and includes a diffuser that diffuses heating return water to the inside; a press sensor sensing the pressure in the heat storage pipe and a circulation pump pressing and circulating the heat medium that are connected to the heat storage pipe; a heat medium supplementary water tank that is connected to the heat storage pipe through a pressing pump to supplement the lack of the heat medium; an auxiliary boiler that has a heating water outlet connected to a heating water supply pipe of the heat storage tank through a 3-way valve for controlling the heating water supply, and a heating water return port connected to the diffuser of the heat storage tank through a 3-way valve for controlling the heating water return, a check valve that is connected between the 3-way valve for controlling the heating water supply and the heating water return port of the auxiliary boiler; and a heating load that is connected to the heating water outlet of the auxiliary boiler and the 3-way valve for controlling the heating water return.

8 Claims, 4 Drawing Sheets

(51) Int. Cl.
*F24D 3/08* (2006.01)
*F24D 19/10* (2006.01)
*F24D 11/00* (2006.01)
*F24D 17/00* (2006.01)

(52) U.S. Cl.
CPC .............. *F24D 19/1066* (2013.01); *F24J 2/30* (2013.01); *F24D 17/0068* (2013.01); *F24D 2200/02* (2013.01); *F24D 2200/14* (2013.01); *F24D 2220/025* (2013.01); *F24D 2220/0278* (2013.01); *F24D 2220/042* (2013.01); *F24D 2220/046* (2013.01); *F24D 2220/048* (2013.01); *F24D 2220/06* (2013.01); *F24D 2240/26* (2013.01); *Y02B 10/20* (2013.01)

(56) References Cited

U.S. PATENT DOCUMENTS

| | | | | |
|---|---|---|---|---|
| 4,052,000 A | * | 10/1977 | Honikman | F24D 17/0068 126/592 |
| 4,052,001 A | * | 10/1977 | Vogt | 126/585 |
| 4,527,618 A | * | 7/1985 | Fyfe | F24D 11/0221 126/635 |
| 8,242,920 B1 | * | 8/2012 | Mostowfi et al. | 340/605 |
| 8,820,315 B2 | * | 9/2014 | Jackman | 126/591 |
| 2006/0231638 A1 | * | 10/2006 | Belz et al. | 236/12.12 |

FOREIGN PATENT DOCUMENTS

| | | |
|---|---|---|
| JP | H11-201559 A | 7/1999 |
| JP | 2002-267259 A | 9/2002 |
| JP | 2002-297259 A | 9/2002 |
| KR | 10-0734562 B1 | 7/2007 |
| KR | 10-2010-0106165 A | 10/2010 |

OTHER PUBLICATIONS

Machine Translation of JP H11-201559 A.*
English Language Abstract of JP 2002-267259 A.
English Language Abstract of KR 10-2010-0106165 A.
English Language Abstract of KR 10-0734562 B1.
English Language Abstract of JP S59-100353 A.
English Language Abstract of JP H11-201559 A.
English Language Abstract of JP 2002-297259 A.
International Search Report mailed Nov. 30, 2011.

* cited by examiner

SOLAR THERMAL SYSTEM

TECHNICAL FIELD

The present invention relates to a solar thermal system, and more particularly, to a solar thermal system which has improved use efficiency, enables heat acquired in a heat-collecting unit to be quickly used for a heating and hot water supply load, and can be operated in a stable manner.

BACKGROUND ART

Generally, a solar thermal system is configured to include a heat-collecting unit, a heat storage unit, and a use unit and is a system that stores the heat collected in the heat-collecting unit in the heat storage unit through a heat exchanger and allows the use unit to use the stored heat as a heating and hot water supply heat source.

There are problems in that the existing solar thermal system is expensive, in case of heating, the use efficiency of the system is insignificant as 40 to 50%, a failure of the system frequently occurs due to overheating, and the like.

That is, when a temperature of heating return water passing through a heating load is higher than that of a lower portion of a heat storage tank, temperature stratification in the heat storage tank is scattered, such that the stored heat value is not sufficiently used as a heating source. When a design of a heating system is wrong, an auxiliary boiler may heat water in the heat storage tank under the heating condition in which preheating is performed by solar heat and heat exchange with a heat collector is performed at a lower portion of the heat storage tank to sequentially heat water. Therefore, a load response speed is actually slow when the heat source is always required like winter season, such that the overall system efficiency may be degraded.

Further, the existing solar thermal system has problems in that there is no warning system even when leakage occurs in a heat medium circulation line, a consumer directly supplements water as much as a naturally decreased amount, and the stored water temperature rises to 80° C. or higher in summer season, such that it is likely to have a burn at the time of using hot water.

Further, when the system is overheated, the collected heat is discharged to an AC power heat radiator installed in the heat-collecting unit, such that the external power usage may be increased.

DISCLOSURE

Technical Problem

The present invention is the invention for improving the above problems and an object of the present invention is to provide a solar thermal system in which temperatures of heating water before and after passing through a heating load are compared with each other to perform a variable flow rate control on a heating circulation flow rate, thereby lowering temperature of heating return water as maximally as possible and a formation of a passage through which a heating return water is introduced into a heat storage tank is changed according to the temperature of the heating return water to maximize a use of a heating source of a stored heat value, thereby improving use efficiency of the system.

Further, another object of the present invention is to provide a solar thermal system in which a heat medium temperature is increased by controlling a variable flow rate of a heat collector heat medium circulation flow rate and passages are formed in a lower portion and an upper portion of a heat storage tank so as to be perform a heat exchange with a heat medium, thereby enabling heat acquired in a heat-collecting unit to be quickly used in a heating and hot water supply load.

Further, still another object of the present invention is to provide a solar thermal system in which a pressure sensor is installed in a heat-collecting unit and a check valve is installed in heat medium supplementary water tank to inform an automatic heat medium supplement and an alarm of a leakage at a predetermined pressure or less, a low water level sensor is installed in a heat medium supplementary water tank to inform a supplement of heat medium, thereby preventing an operation error, a bypass line to which a mixing valve is applied is installed in a hot water supply outlet and a direct water(cold water) inlet to supply a proper temperature of hot water, and an alarm is issued when a temperature of an upper portion of a heat storage tank is above a predetermined temperature and stored heat is discharged through a DC power heat radiator and a circulation pump that are actuated by a solar PV(photovoltaic) module installed at the upper portion of the heat storage tank, thereby implementing a stable operation of the system.

Technical Solution

In one general aspect, a solar thermal system comprises: a solar heat collector that absorbs solar heat and heats a heat medium received therein; a heat storage tank that contains heating water, includes a first heat storage exchanger and a second heat storage exchanger connected to the solar heat collector through an heat storage pipe at the upper and lower portions therein respectively, and include a diffuser that diffuses heating return water to the inside; a press sensor sensing the pressure in the heat storage pipe and a circulation pump pressing and circulating the heat medium that are connected to the heat storage pipe; a heat medium supplementary water tank that is connected to the heat storage pipe through a pressing pump to supplement the lack of the heat medium; an auxiliary boiler that has a heating water outlet connected to a heating water supply pipe of the heat storage tank through a 3-way valve for controlling the heating water supply, and a heating water return port connected to the diffuser of the heat storage tank through a 3-way valve for controlling the heating water return; a check valve that is connected between the 3-way valve for controlling the heating water supply and the heating water return port of the auxiliary boiler; and a heating load that is connected to the heating water outlet of the auxiliary boiler and the 3-way valve for controlling the heating water return.

The diffusers may be disposed at the middle portion and the lower portion of the heat storage tank, respectively, the diffusers disposed at the middle portion and the lower portion are connected to different outlets of the 3-way valve with the inlet connected to the heating return water pipe, and the 3-way valve is controlled its opening such that the heating return water flows to the portion with higher temperature than the temperatures of the heating return water at predetermined heights of the heat storage tank.

The heat storage tank may include a heat storage tank hot water heat exchanger with a direct water pipe connected to the inlet, a mixing valve may be connected to a hot water pipe connected to the outlet of the heat storage tank hot water heat exchanger through the hot water heat exchanger of the auxiliary boiler, the direct water pipe may be connected to one side of the mixing valve, while temperature sensors may be disposed at the hot water inlet and outlet of the mixing valve and a direct water inlet respectively, and the temperature of discharged water may be controlled on the basis of the temperature sensed by the temperature sensor disposed at the inlet and outlet of the mixing valve.

An upper temperature sensor, a middle temperature sensor, and a lower temperature sensor that sense the temperatures at the upper, middle, and lower portions of the heat storage tank may be configured to control the inflow position of the heating return water and the inflow position of the heat medium of the heat collecting pipe.

A heat radiator may be connected to the upper portion of the heat storage tank through a heat radiating pipe to radiate heat by circulating the heating water in the heat storage tank to the outside, a 2-way valve and the circulation pump may be connected to one end of the heat radiating pipe, while a solar PV module may be connected to the heat radiator to be driven by the power supplied from the solar PV module.

Advantageous Effects

As set forth above, according to the embodiments of the present invention, it is possible to perform the variable flow rate control on the heating circulation flow rate to maximally lower the heating return water and maximize the use of the stored heat value in the heating source, implement the rapid responsiveness to the heating and hot water supply load to greatly increase the system efficiency, and detect the lack state of the heat medium to inform a user of the supplement of the heat medium, constantly maintain the hot water supply temperature, reduce the power consumption, an minimize the actuation of the auxiliary boiler.

BEST MODE

Hereinafter, a configuration and an operation of an exemplary embodiment of the present invention will be described in detail with reference to the accompanying drawings.

Figure 1:
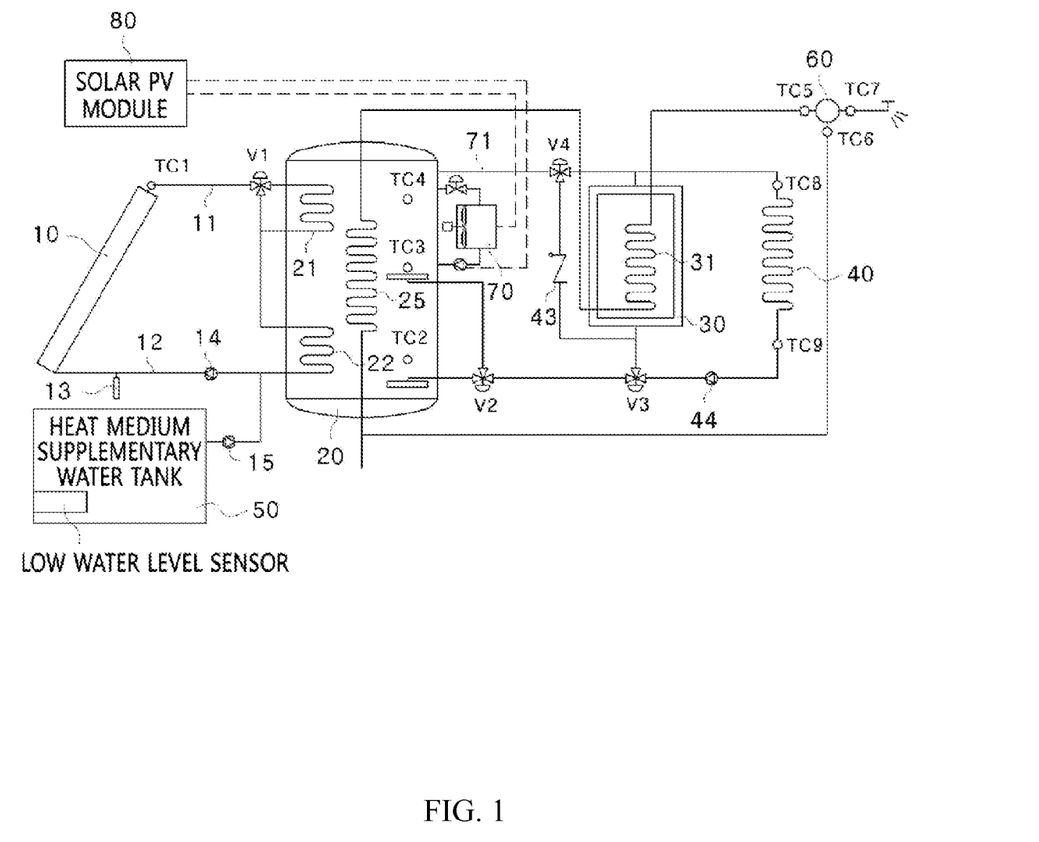
FIG. 1 is a diagram illustrating an overall systematic diagram of a solar thermal system according to the present invention.

FIG. 1 illustrates an overall systematic diagram of a solar thermal system according to an exemplary embodiment of the present invention and the solar thermal system is configured to largely include a solar heat collector 10 that absorbs solar energy and converts the solar energy into heat, a heat storage tank 20 that stores the heat absorbed in the solar heat collector 10, an auxiliary heat exchanger 30 that heats heating water or hot water preheated in the heat storage tank 20 to a predetermined temperature, a heating load 40 that uses the stored heat, a heat medium supplementary water tank 50 that supplements insufficient heat medium in a heat storage pipe of the solar heat collector 10, a mixing valve 60 that supplies hot water at a predetermined temperature, a heat radiator 70 that radiates heat when the heat storage temperature of the heat storage tank 20 is a predetermined temperature or higher, and a solar PV module 80 that converts sunlight into electrical energy so as to supply the driving power of the heat radiator 70.

Figure 2:
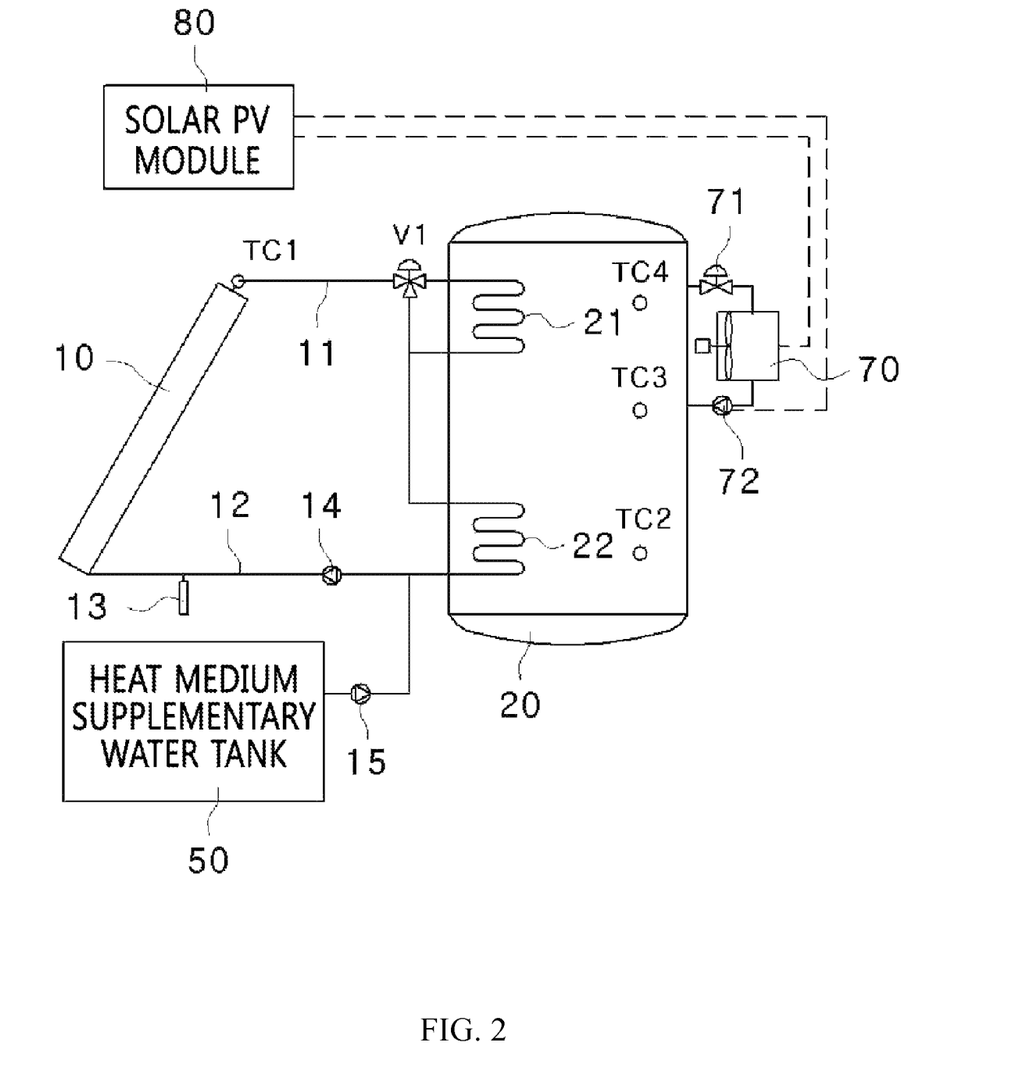
FIG. 2 is a diagram illustrating a systematic diagram of a solar heat collecting system in FIG. 1.

Hereinafter, the systematic diagram for each system will be described in more detail. FIG. 2 is a diagram illustrating a systematic diagram of a solar heat collecting system in FIG. 1.

First and second heat storage exchangers 21 and 22 are connected in series between a heat collecting pipe 11 that is mounted at a heat medium outlet of the solar heat collector 10 that is installed outside a building and collects solar heat and a heat collecting pipe 12 that is installed at a heat medium inlet, wherein the first heat storage exchanger 21 is installed at the upper portion within the heat storage tank 20 and the second heat storage exchanger 22 is at the lower portion within the heat storage tank 20. Therefore, the heat medium heated in the solar heat collector 10 is circulated to the first and second heat storage exchangers 21 and 22, such that the heating water accommodated within the heat storage tank 20 is heated by being heat-exchanged with the first and second heat storage exchangers 21 and 22.

Further, the heat collecting pipe 11 connecting the solar heat collector 10 with the first heat storage exchanger 21 installed at the upper portion of the heat storage tank 20 is connected with a three-way valve Vi and the three-way valve Vi serves to change a passage of the heat collecting pipe 11 so that the passage of the heat collecting pipe 11 is formed in the second heat storage exchanger 22 via the first heat storage exchanger 21 or is directly formed in the second heat storage exchanger 22 without passing through the first heat storage exchanger 21. Therefore, in the solar heat collector 10, the heat medium flowing through the heat collecting pipe 11 may be circulated to the solar heat collector 10 via the first and second heat storage exchangers 21 and 22 or may be circulated to the solar heat collector 10 via only the second heat storage exchanger 22 without passing through the first heat storage exchanger 21.

In the case in which the heat medium is circulated via the first heat storage exchanger 21 in the heat storage tank 20, when the heat storage amount of the heat storage tank 20 is substantially consumed, that is, water temperature sensed by an upper temperature sensor TC4 is less than a predetermined temperature and a demand for heat value exist the water temperature of the upper portion is quickly heat-stored, the response speed to the demand for heat value is quick.

The heat collecting pipe 11 is connected with the temperature sensor TC1 that may measure the temperature of the solar heat collector 10 and the heat collecting pipe 12 is connected with a pressure sensor 13 that senses the pressure within the heat collecting pipe 12 and is connected with a circulation pump 14 that circulates the heat medium between the solar heat collector 10 and the heat storage tank 20 via the heat collecting pipes 11 and 12.

When the temperature of the heat medium within the heat collecting pipe 12 excessively rises, the pressure sensor 13 detects the pressure within the heat collecting pipe 12 so as to prevent the pressure from rising above the set value and transfers the detected pressure to a controller (not illustrated) that controls the overall operation of the solar thermal system.

The controller determines the heat value acquired by the solar heat collector 10 through the temperature sensor TC1 to increase the revolution of the circulation pump 14 and increase the flow rate when the acquired heat value is increased, thereby increasing the heat storage value and reduce the revolution of the circulation pump 14 and reduce the flow rate when the acquired heat value is small, thereby preventing the circulation pump 14 from being frequently turned on/off to increase the water-proofing of the circulation pump 14 and reduce the power consumption.

Further, when the heat medium circulated through the heat collecting pipe 12 is insufficient, one end of the heat collecting pipe 12 is connected with a heat medium supplementary water tank 50 for supplementing the heat medium via a pressing pump 15. A low water level sensor 51 is installed within the heat medium supplementary water tank 50 to transfer the detected signal to the controller and the controller informs a user of the insufficient heat medium through a normal warning means, when receiving the low level detection signal from the heat medium supplementary water tank 50.

Further, the upper portion, the middle portion, and the lower portion of the heat storage tank 20 are each mounted with an upper temperature sensor TC2, a middle temperature sensor TC3, and a lower temperature sensor TC4 to detect the temperature of the heating water within the heat storage tank 20 at each location and transfer the sensed temperature to the controller.

Further, the upper portion of the heat storage tank 20 is connected with a heat radiator 70 via a heat radiating pipe and is connected with a two-way valve 71 and a circulation pump 72 in one's way of the heat radiating pipe. Further, the heat radiator 70 is connected with the solar PV module 80 to be driven with power supplied from the solar PV module 80 rather than a commercial power.

Therefore, when the upper temperature of the heat storage tank 20 is above a predetermined temperature by the upper temperature sensor TC2, the controller actuates the warning means and actuates the heat radiator 70 and the circulation pump 72 that are installed at the upper portion of the heat storage tank 20 to discharge the stored heat value. The heat radiator 70 and the circulation pump 72 are driven with power supplied from the solar PV module 80 to save power cost by not using the commercial power.

Figure 3:
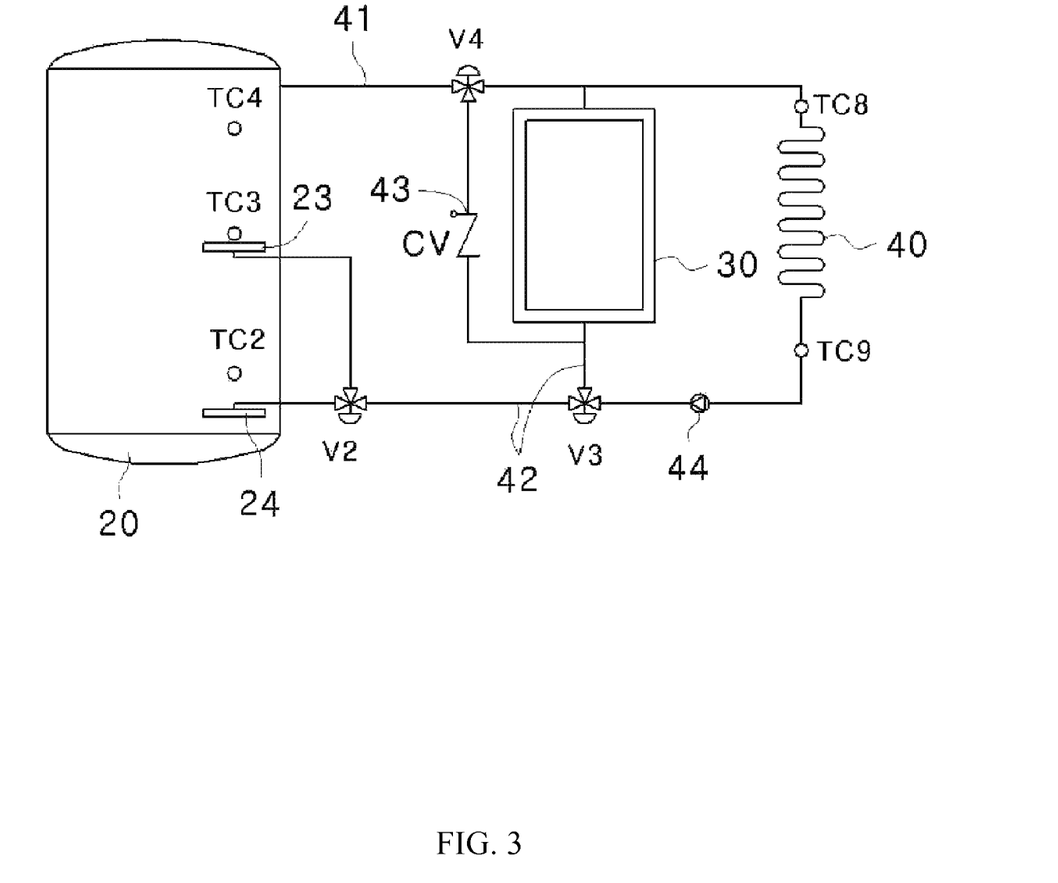
FIG. 3 is a diagram illustrating a systematic diagram of a solar heating system in FIG. 1.

FIG. 3 is a diagram illustrating a systematic diagram of a solar heating system in FIG. 1.

The outlet that is installed at one portion of the upper portion of the heat storage tank 20 is connected with a heating water supply pipe 41 and the heating water supply pipe 41 is connected with the heating water outlet of the auxiliary boiler 30 via the three-way valve V4 for controlling the heating water supply and is connected with one end of the heating load 40.

The other ends of a heating water return port of the auxiliary boiler 30 and the heating load 40 are connected with a heating return water pipe 42 via the 3-way valve V3 and the heating return water pipe 42 connected with the other end of the 3-way valve V3 for controlling the heating water return is connected with diffusers 23 an 24 that are installed in the heat storage tank 20.

The diffusers 23 and 24 sprays returned heating water into the heat storage tank 20 to quickly be diffused therein, thereby quickly performing the heat exchange. As illustrated, the diffuser 23 is installed at the middle portion of the heat storage tank 20 and the diffuser 24 may be installed at the lower portion of the heat storage tank 20. In this case, the passage may be changed so that the heating water returned through the heating return water pipe 42 is supplied to the middle diffuser 23 or the lower diffuser 24 through the 3-way valve V2 according to the temperature thereof.

Further, one end of the heating water supply pipe 41 or one end of the heating return water pipe 42 is provided with a circulation pump 44 for circulating the heating water. In the illustrated example, the circulation pump 44 is installed in the heating return water pipe 42. In the heating system having the structure, the heating passage will be described according to the difference between the temperature of the heat storage tank and the temperature of the heating return water.

First, the case where the temperature of the heating water in the heat storage tank 20 is higher than the temperature set by the user is described, in which the controller determines that the temperatures sensed by the temperature sensors TC2 to TC4 in the heat storage tank 20 are higher than the heating temperature set by the user, so that the 3-way valve V4 is controlled to form a passage to the heating load 40 from the heat storage tank 20, while the 3-way valve V3 is controlled to form a passage to the heat storage tank 20 from the heating load 40. Therefore, the heating water discharged through the heating water supply pipe 41 of the heat storage tank 20 is repeatedly circulated, that is, directly returns to the heat storage tank 20 through the heating load 40, exchanges heat, and then is discharged.

Second, the case where the temperature of the heating water at the lower portion in the heat storage tank is lower than the temperature set by the user but the temperature of the heating water at the upper portion is higher than the temperature set by the user is described, in which the controller determines that the temperature at the lower portion is lower than the heating temperature set by the user and the temperature at the upper portion is higher than the heating temperature set by the user, from the temperatures sensed by the temperature sensors TC2 to TC4 in the heat storage tank 20.

Accordingly, the 3-way valve V4 is controlled to form a passage to the heating load 40 from the heat storage tank 20, while the 3-way valve V3 is controlled to form a passage to the heat storage tank 20 from the heating load 40, and particularly, the 3-way valve V2 is controlled to form a passage to the diffuser 23 at the middle portion from the 3-way valve V3. Therefore, the heating water discharged through the heating water supply pipe 41 of the heat storage tank 20 is repeatedly circulated, that is, returns to the middle position of the heat storage tank 20 through the heating load 40, exchanges heat, and then is discharged.

Third, the case where the temperature of the heating water in the heat storage tank 20 is lower than the temperature set by the user is described, in which the controller determines that the temperatures sensed by the temperature sensors TC2 to TC4 in the heat storage tank 20 are lower than the heating temperature set by the user, so that the 3-way valve V4 is controlled to form a passage such that the passage to the heat storage tank 20 is blocked, while the 3-way valve V3 is controlled to form a passage to the auxiliary heat exchanger 30 from the heating load 40. Therefore the heating water heated by exchanging heat in the auxiliary heat exchanger 30 is repeatedly circulated, that is, directly returns to the auxiliary heat exchanger 30 through the heating load 40, exchanges heat, and then is discharged.

As described above, since the heat storage tank 20 has a stratification structure in which the temperature of the water is high at the upper portion and low at the lower portion, the heat storage tank 20 heats the heating water therein or heats the heating water using the external auxiliary heat exchanger 30 by comparing the temperature of the heating water returning through the heating load 40 with the temperatures at the predetermined heights in the heat storage tank 20, so that it is possible to use the heat value in the heat storage tank 20 as much as possible.

Further, the controller controls the variable flow rate of the heating circulation flow rate, that is, the degree of operation (RPM) of the circulation pump, by comparing the temperature of the heating water before and after passing through the heating load 40, using the temperature sensors TC8 and TC9 disposed at the front and rear ends of the heating load 40.

Further, other passage port of the 3-way valve V4 for controlling the heating water supply is connected to the heating water return port of the auxiliary boiler 30 through a check valve 43. The check valve 43 allows the heating water supplied from the heat storage tank 20 through the heating water supply pipe 41 to be supplied to the auxiliary boiler 30 and exchange heat if necessary, but it is to prevent the heating water returning to the auxiliary boiler 30 through the heating load 40 and the 3-way valve V3 for controlling the heating water return from flowing into the heating water supply pipe 41.

Figure 4:
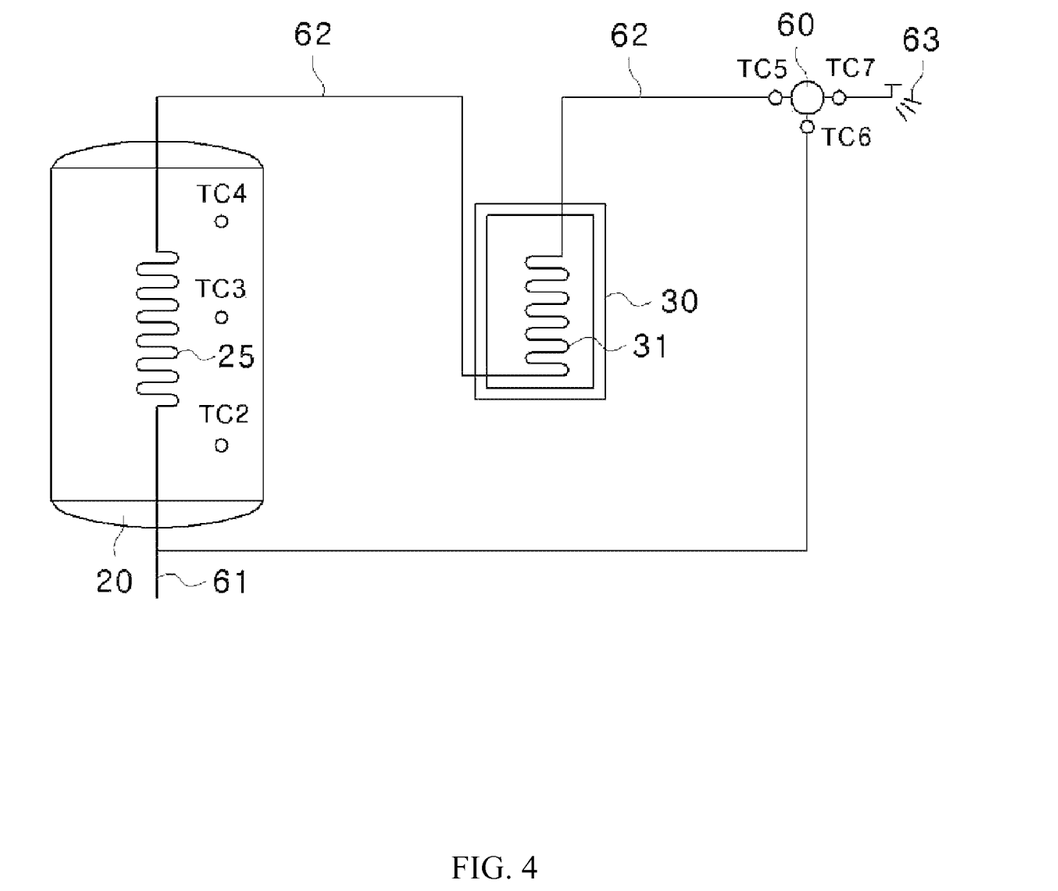
FIG. 4 is a diagram illustrating a systematic diagram of a solar hot water supply system in FIG. 1.

FIG. 4 shows the solar hot water supply system in FIG. 1.

A heat storage tank hot water heat exchanger 25 with an inlet connected with a direct water pipe 61 is disposed in the heat storage tank 20, and a mixing valve 60 is connected to the other end of a hot water pipe 62 with one end connected to the outlet of the heat storage tank hot water heat exchanger 25, through a hot water heat exchanger 32 disposed in the auxiliary boiler 30. The direct water pipe 61 is directly connected to the other side of the mixing valve 60 and a hot water valve 63 is connected to another side. Further, temperature sensors TC5, TC6, and TC7 are disposed at the hot water inlet, outlet, and direct inlet of the mixing valve 60, respectively, to sense the temperatures of the hot water and direct water. Therefore, a controller controls the opening level of the mixing valve 60 by comparing the temperatures sensed by the temperature sensors TC5, TC6, and TC7 with a hot water temperature set by the user. That is, the mixing valve 60 supplies hot water at the temperature set by the user, by controlling the amount of the hot water flowing in through the hot water pipe 62 and the amount of the direct water flowing in through the direct water pipe 61 respectively. Therefore, it is possible to prevent a burn by preventing high-temperature hot water from be unexpectedly discharged.

The direct water pipe 61 is always open, so that the hot water heated by the heat storage tank 20 or the auxiliary boiler 30 is supplied to the hot water valve 63 through the hot water pipe 62 and discharged by the pressure of the direct water flowing inside through the direct water pipe 61, when the user opens the hot water valve 63 disposed in the house.

EXPLANATION OF REFERENCE NUMERALS AND SYMBOLS

- 10: Solar heat collector
- 11, 12: Heat collecting pipe
- 13: Pressure sensor
- 14: Circulation pump
- 15: Pressing pump
- 20: Heat storage tank
- 21: First heat storage exchanger
- 22: Second heat storage exchanger
- 23, 24: Diffuser
- 25: Heat storage tank hot water exchanger
- 30: Auxiliary heat exchanger
- 40: Heating load
- 41: Heating water supply pipe
- 42: Heating return water pipe
- 43: Check valve
- 50: Heat medium supplementary water tank
- 51: Low water level sensor
- 60: Mixing valve
- 61: Direct water pipe
- 62: Hot water pipe
- 63: Hot water valve
- 70: Heat radiator
- 71: 2-way valve
- 72: Circulation pump
- 80: Solar PV(photovoltaic) module
- V1~V4: 3-way valves
- TC1~TC9: Temperature sensors

The invention claimed is:

1. A solar thermal system comprising:
   a solar heat collector that absorbs solar heat and heats a heat medium received therein;
   a heat storage tank that contains heating water, includes a first heat storage exchanger and a second heat storage exchanger connected to the solar heat collector through a heat storage pipe disposed at upper and lower portions therein respectively, and includes at least one diffuser that diffuses heating return water to an inside of the heat storage tank;
   a pressure sensor sensing a pressure in the heat storage pipe and a circulation pump pressing and circulating the heat medium, wherein the pressure sensor and the circulation pump are connected to the heat storage pipe;
   a heat medium supplementary water tank that is connected to the heat storage pipe through a pressing pump to supplement a lack of the heat medium;
   an auxiliary boiler that has a heating water outlet connected to a heating water supply pipe of the heat storage tank through a first 3-way valve for controlling the heating water supply, and a heating water return port connected to the at least one diffuser of the heat storage tank through a second 3-way valve for controlling the heating water return;
   a check valve that is connected between the first 3-way valve for controlling the heating water supply and the heating water return port of the auxiliary boiler; and
   a heating load that is connected to the heating water outlet of the auxiliary boiler and the second 3-way valve for controlling the heating water return.

2. The system of claim 1, wherein the at least one diffuser includes a first
   diffuser disposed at a middle portion of the heat storage tank and a second diffuser disposed at the lower portion of the heat storage tank, respectively, the first and second diffusers disposed at the middle portion and the lower portion respectively are connected to different outlets of the second 3-way valve having an inlet connected to the heating return water pipe, and a passage of the second 3-way valve is controlled such that the heating water flows to a portion with higher temperature than the temperatures of the heating return water at predetermined heights of the heat storage tank.

3. The system of claim 2, wherein the heat storage tank includes a heat storage tank hot water heat exchanger having a direct water pipe connected to the inlet, a mixing valve is connected to a hot water pipe connected to the outlet of the heat storage tank hot water heat exchanger through the hot water heat exchanger of the auxiliary boiler, the direct water pipe is connected to one side of the mixing valve, temperature sensors are disposed at the hot water inlet and outlet of the mixing valve and a direct water inlet respectively, and the temperature of discharged water is controlled on the basis of the temperature sensed by the temperature sensors disposed at the inlet and outlet of the mixing valve.

4. The system of claim 3, wherein an upper temperature sensor, a middle temperature sensor, and a lower temperature sensor that sense the temperatures are provided at the upper, middle, and lower portions of the heat storage tank to control an inflow position of the heating return water and an inflow position of the heat medium of the heat collecting pipe.

5. The system of claim 3, wherein a heat radiator is connected to the upper portion of the heat storage tank through a heat radiating pipe to radiate heat by circulating the heating water in the heat storage tank to the outside, a 2-way valve and another circulation pump are connected to one end of the heat radiating pipe, a solar PV module is connected to the heat radiator to be driven by the power supplied from the solar PV module, and the heating water is circulated to the heat radiator to prevent overheating, when the temperature sensed by the hot water temperature sensor disposed at the outlet of the solar heat collector is higher than a predetermined temperature.

6. The system of claim 1, wherein the heat storage tank includes a heat storage tank hot water heat exchanger having a direct water pipe connected to the inlet, a mixing valve is connected to a hot water pipe connected to the outlet of the heat storage tank hot water heat exchanger, and the direct water pipe is connected to one side of the mixing valve to control the temperature of discharged water.

7. The system of claim 1, wherein a lower water level sensor is disposed in the heat medium supplementary water tank to automatically supplement the heat medium and generate an alarm of leaking.

8. The system of claim 2, wherein the heat storage tank includes a heat storage tank hot water heat exchanger having a direct water pipe connected to the inlet, a mixing valve is connected to a hot water pipe connected to the outlet of the heat storage tank hot water heat exchanger through the hot water heat exchanger of the auxiliary boiler, the direct water pipe is connected to one side of the mixing valve, while temperature sensors are disposed at the hot water inlet and outlet of the mixing valve and a direct water inlet respectively, and the temperature of discharged water is controlled on the basis of the temperature sensed by the temperature sensor disposed at the inlet and outlet of the mixing valve.

* * * * *